US006721378B1

(12) United States Patent
Happonen

(10) Patent No.: US 6,721,378 B1
(45) Date of Patent: Apr. 13, 2004

(54) CIRCUIT AND METHOD FOR RECEIVING DATA

(75) Inventor: Aki Happonen, Kiiminki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/449,578

(22) Filed: Nov. 29, 1999

Related U.S. Application Data

(63) Continuation of application No. PCT/EP97/02854, filed on Jun. 2, 1997.

(51) Int. Cl.$^7$ ................................................ H04L 7/00
(52) U.S. Cl. ......................... 375/357; 375/342; 375/368
(58) Field of Search ................................. 375/316, 355, 375/357, 365, 366, 368, 342, 354, 371; 370/503, 514, 518; 713/400, 500, 600

(56) References Cited

U.S. PATENT DOCUMENTS

| 4,942,590 | A |   | 7/1990  | Terada .......................... 375/149 |
| 5,103,465 | A | * | 4/1992  | Crisler et al. ................. 375/359 |
| 5,473,610 | A |   | 12/1995 | Rainard ..................... 370/395.62 |
| 5,928,293 | A | * | 7/1999  | Jobling et al. .................... 701/2 |
| 5,946,362 | A | * | 8/1999  | Ha ............................... 375/357 |
| 6,128,358 | A | * | 10/2000 | Urata ........................... 375/366 |

FOREIGN PATENT DOCUMENTS

| DE | 36 16 556 | 11/1987 |
| WO | 94/00939  | 6/1993  |

OTHER PUBLICATIONS

Jan. 16, 1998, International Search Report for PCT/EP97/02854.

"Synchronization for Passive optical Networks" Topliss, et al. Journal of Lightwave Technology, vol. 13, No. 5, pp. 947–953.

* cited by examiner

Primary Examiner—Chieh M. Fan
(74) Attorney, Agent, or Firm—Squire, Sanders & Dempsey L.L.P.

(57) ABSTRACT

A circuit for receiving data includes a first receiver having an input for receiving data and an input for receiving a first clock signal. The data is clocked into the first receiver by the first clock signal. The circuit also has a second receiver having an input for receiving data and an input for receiving a second clock signal. The first and second clock signals have the same frequency and are phase shifted with respect to one another. The data is clocked into the second receiver by the second clock signal. Determination is provided to determine if at least one of the receivers has correctly received the data. A first output of one of the receivers is enabled in accordance with the determination.

28 Claims, 3 Drawing Sheets

Fig.2b. CLK 1

Fig.2c. CLK 2

DATA IS A PARALLEL BUS FROM CIRCUIT 1 TO CIRCUIT 2

CIRCUIT AND METHOD FOR RECEIVING DATA

This application is a continuation of international application serial number PCT/EP97/102854, filed Jun. 2, 1997.

FIELD OF THE INVENTION

The present invention relates to a circuit and method for receiving data and, in particular, but not exclusively to a circuit and method for receiving data suitable for use in a telecommunications network such as a mobile telecommunications network.

DESCRIPTION OF RELATED ART

In known arrangements where data is sent from one circuit to another circuit via a data bus, each of the two circuits has its own clock signal. The first clock signal is used by the transmitting circuit to clock the data onto the data bus. The second clock signal is used by the receiving circuit to clock the data from the data bus into, for example, a shift register. These two clock signals may have the same frequency. However, the effective phase difference between the clock signal of the transmitting circuit and the clock signal of the receiving circuit is unknown. This effective phase difference generally depends on two main factors. Firstly, there may be a phase difference between the clock signal of the transmitting circuit and the clock signal of the receiving circuit. Secondly, the transmission delay in the data bus between the transmitting circuit and receiving circuit will contribute to the effective phase difference. As the effective phase difference between the two clock signals of the two circuits is unknown, this can give rise to problems.

Generally, data from the transmitting circuit will be, clocked into the receiving circuit on the rising edge of the clock signal of the receiving circuit. If the data is clocked onto the data bus by the transmitting circuit using a clock signal which has the same frequency as the clock signal used by the receiving circuit, then the clock signal of the receiving circuit will effectively have the same frequency as the incoming data. If the receiving circuit tries to read the incoming data at points where transitions in signal level can occur, then the receiving circuit will be unable to reliably read the data from the transmitting circuit. For example, a "1" might be read as a "0" or vice versa. This is undesirable.

To deal with this problem, it has been proposed to use a clock signal in the receiving circuit which has twice the frequency of the clock signal used by the transmitting circuit. However, this complicates the circuitry and it is generally preferred that the clock signals of the transmitting circuit and the receiving circuit have the same frequency. It has also been proposed to use a handshaking protocol between the receiving circuit and the transmitting circuit. However, this has the disadvantage that the number of wires between the transmitting circuit and the receiving circuit needs to be increased. In some applications, this is undesirable as it can complicate the arrangement and lead to increased costs.

SUMMARY OF THE INVENTION

It is therefore an object of embodiments of the present invention to reduce or at least mitigate these problems.

According to a first aspect of the present invention, there is provided a circuit for receiving data comprising:

a first receiver means having input means for receiving said data and an input for receiving a first clock signal, whereby said data is clocked into said first receiver means by said first clock signal;

a second receiver means having input means for receiving said data and an input for receiving a second clock signal, said first and second clock signals having the same frequency and being phase shifted with respect to one another, whereby said data is clocked into said second receiver means by said second clock signal;

determining means for determining if at least one of said receiver means has correctly received said data; and means for selectively enabling a first output of one of the receiver means in accordance with the determination made by said determining means.

By using two receiver means which both receive the input data using clock signals having the same frequency but phase shifted with respect to one another, the problems caused by the uncertainty in the effective phase difference between the received data and the clock signal of the receiving circuit can be avoided. In particular, if one receiver means is unable to correctly receive the data due to the effective phase shift between one clock signal and the received data being, for example, substantially zero (or n x 360° where n is an integer), the other receiver means should be able to receive the data correctly. It should be appreciated that in certain applications of the present invention, the solution provided is cost effective in that it avoids the need to increase the number of lines between the receiving circuit and a transmitting circuit. The costs and complexity associated with the provision of an additional receiving means may be minimal as compared to the situation where, for example, an additional line is required for a handshaking protocol.

Preferably said received data has half the frequency of the first and second clock signals so that one bit of data will be received in one clock cycle.

Preferably, one of the first and second clock signals is the inverse of the other of said first and second clock signals. This is particularly advantageous in that the two clock signals can be simply obtained using a common clock signal and for example an inverter. However, it should be appreciated that in certain embodiments of the present invention, the first and second clock signals may have a phase shift of other than 180°.

Preferably, the received data includes a known pattern and the determining means is arranged to determine if the data received by at least one of the receiver means includes said known pattern. This known pattern may be mixed in with the actual data to be transmitted. This provides an easy and simple way to check whether or not the data has been correctly received by the respective receiving circuit.

Preferably, said data includes data indicating the beginning of said data, said determining means being arranged to determine if the data received by at least one of said receiving means includes the data indicating the beginning of the data.

Preferably said determining means is arranged to determine if the data received by at least one receiver includes the known pattern only if the data indicating the beginning of data has been detected.

Preferably, the determining means comprises first comparison means connected to a second output of the first receiver means and second comparison means connected to a second output of the second receiver means. Where the received data includes a known pattern, the respective comparison means may compare the known pattern with the actual pattern received by the respective receiver means.

In one embodiment, the determining means is arranged to determine if one of the first and second receiver means has correctly received the data and said enabling means is arranged to enable the first output of said one of said first and second receiver means if the determining means determines that the data has been correctly received and to enable the first output of the other of said first and second receiving means if the determining means determines that the data has not been correctly received by said one receiver means. In one embodiment of the present invention, the data received by only one of the two receiver means is checked to see if it is correct. If that data is not correct, then the other receiver means may be automatically enabled. This has the advantage that the processing time required in order to determine which receiver means should be enabled can be reduced. It is also a reasonable assumption in certain embodiments of the present invention that if one receiver means has not correctly received the data, the other receiver means has correctly received that data.

In an alternative embodiment of the present invention, the determining means is arranged to determine if the other of the first and second receiver means has correctly received said data only if it is determined by the determining means that said one receiver means has not correctly received said data. It should be appreciated that in certain embodiments of this invention, by also checking to see if the data has been correctly received by the other of the receiver means, a determination can be made as to whether or not the data which is received by the receiving circuit has been corrupted. If neither of the two receiver means correctly receive the data, then it can be assumed that the data has been corrupted.

In a further embodiment of the present invention, said determining means, is arranged to determine if the first and second receiver means correctly receive said data and said enabling means is arranged to enable the first output of one of said receiver means which has correctly received the data. Thus, in this modification, the data received by both the first and second receiver means is checked to see whether or not it is correct. This checking of the received data may occur at the same time for the first and second receiver means.

If data is not correctly received by said first receiver means or by said second receiver means, said enabling means provides an error output. This may provide an indication that the data which has been received by the receiving circuit is corrupted.

Preferably, one of the first and second receiver means is designated as a default receiver means, said enabling means being arranged to enable said default receiver means if both said first and second receiver means have correctly received said data. It should be appreciated that in the embodiment where the data received by only one of said receiver means is checked, the data received by the default receiver means may be checked.

One of the receiver means may be a default receiver and if the default receiver does not correctly receive the data, the other receiver means will be the default receiver.

Preferably, said data is frame data and said default receiver means is the receiver means which was enabled by the enabling means for a previous frame of data. In alternative embodiments of the present invention, a given one of the receiver means may be designated at all times as the default receiver means.

Preferably monitoring means are provided for monitoring the number of times at least one of said receiver means is enabled in a predetermined time period. This provides an indication as to the reliability of the connection between the receiving circuit and a further circuit. If the connection is reliable, then one receiver means should be enabled for the majority if not all of the predetermined time period. However, if the connection is unreliable, then both of the receiver means will be enabled a significant number of times in the predetermined time period.

Preferably said data includes error checking data and said circuit further comprises means for checking the received data for errors.

The clock rate is preferably between 20 and 30 MHz and in one embodiment of the present invention is 26 MHz.

Preferably, embodiments of the invention comprise in combination, a receiving circuit such as described hereinbefore, a transmitting circuit and a data bus between said receiving circuit and said transmitting circuit, said receiving circuit being arranged to receive said data from said transmitting circuit via said data bus. It should be appreciated that when monitoring means are provided, those monitoring means may effectively be monitoring the reliability of the data bus.

The transmitting circuit preferably has a clock signal which is used to clock said data onto said data bus, said clock signal of the transmitting circuit having the same frequency as the first and second clock signals of the receiving circuit. Use of the two receiver means removes the problems of the prior art resulting from the unknown effective phase difference between the transmitting and receiving circuits. It should be appreciated that embodiments of the present invention are also applicable to situations where the frequency of the clock signal of the transmitting circuit is not the same as the clock frequencies of the first and second receiver means.

Preferably, the data is transmitted between the transmitting circuit and the receiving circuit in real time. However in some modifications to the present inventions, buffers may be used to deal with faster data rates. The transmission rate would then not be in real time.

The bus may be a serial bus or a parallel bus. However in some embodiments a serial bus is preferred in that it may be more reliable than a parallel bus. The data is advantageously passed between the circuits in digital form although analogue data may be sent. The use of digital data leads to more reliable results.

Embodiments of the present invention are preferably included in a mobile (cellular) telecommunication network. In particular, it is preferred that embodiments of the present invention be included in the base station of a mobile telecommunication network. For example, embodiments of the invention may be included in the receiving part of a base transceiver station or the transmitting part of a base transceiver station.

Preferably said first circuit is arranged to receive data from a station in said mobile telecommunications network and said second circuit is connected to a digital signal processor of said base transceiver station.

According to a second aspect of the present invention, there is provided a method for receiving data comprising the steps of
  clocking said data into a first receiving means using a first clock signal;
  clocking said data into a second receiving means using a second clock signal, the first and second clock signals having the same frequency and being phase shifted with respect to one another;
  determining if at least one of said receiver means has correctly received said data; and
  enabling the output of one of said receiver means in accordance with the determination made in the determining step.

BRIEF DESCRIPTION OF THE DRAWINGS

For a better understanding of the present invention and as to how the same may be carried into effect, reference will now be made by way of example to the accompanying drawings in which:

FIG. 2b shows a clock signal used by the first circuit to clock data onto a data bus;

FIG. 2c shows a clock signal used by the second circuit of FIG. 1;

DETAILED DESCRIPTION OF THE INVENTION

Figure 1:
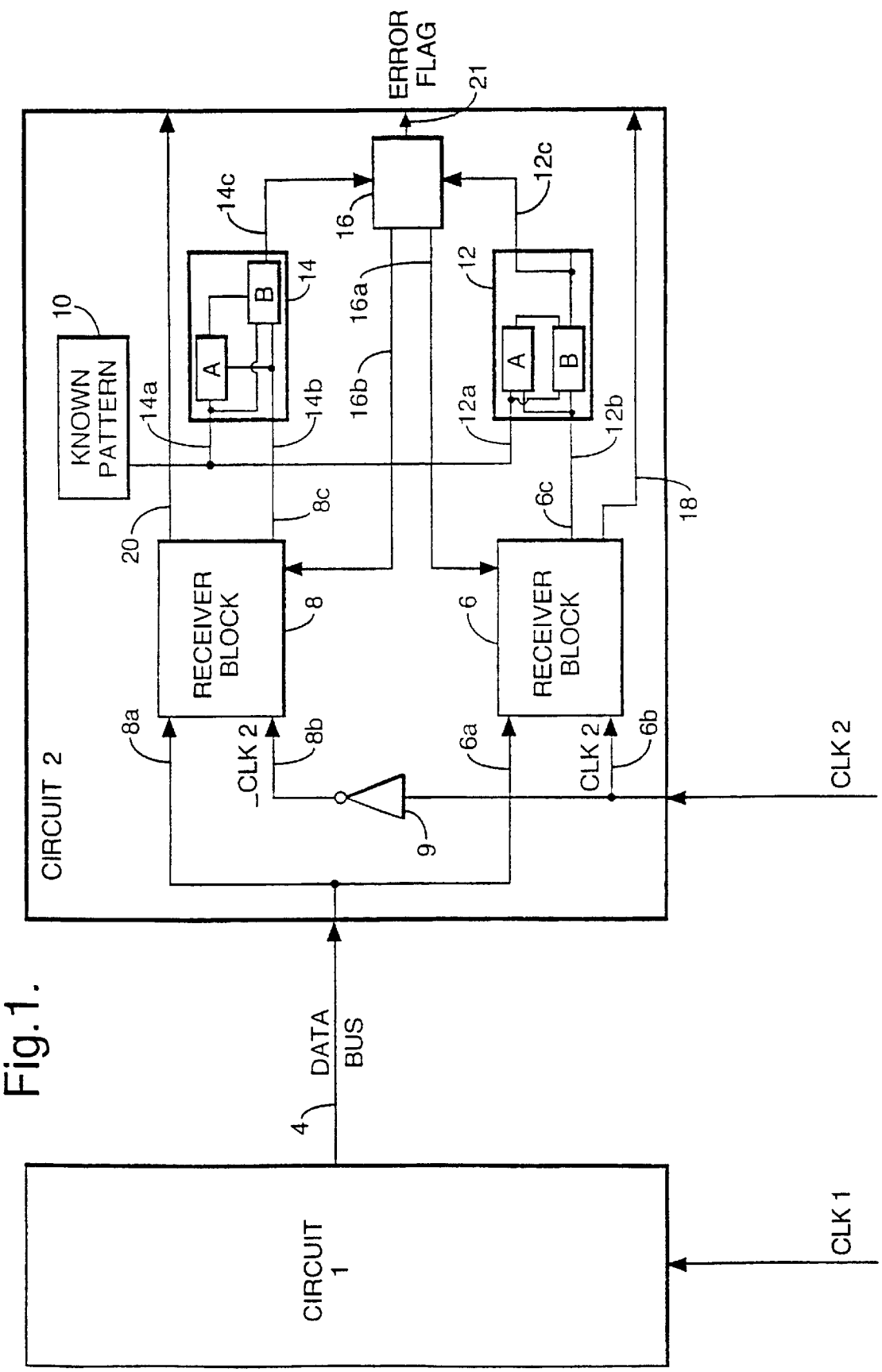
FIG. 1 shows a block diagram of an embodiment of the present invention.

Reference is made to FIG. 1 which illustrates an embodiment of the present invention. A first circuit, circuit 1, is connected to a second circuit, circuit 2, via a data bus 4. Circuit 1 is a transmitter circuit which is arranged to send framed data to circuit 2. The data bus 4 is a serial bus. The data from circuit 1, which is sent to the serial data bus 4, is clocked onto the data bus 4 by the master clock CLK 1 for the first circuit 1.

Circuit 2 which is a receiver circuit is arranged to receive the data from serial data bus 4. Circuit 2 has its own master clock CLK 2. Two separate receiver blocks 6 and 8 are provided in circuit 2. The data from the data bus 4 is input to each of the receiver blocks 6 and 8 via inputs 6a and 8b respectively. Thus both receiver blocks 6 and 8 receive the data sent from circuit 1. Each receiver block 6 and 8 also has its own input 6b and 8b respectively for a clock signal. The first receiver block 6 receives on input 6b an unmodified version of the master clock signal CLK 2 for the receiver circuit 2. The second receiver block 8 receives on input 8b a modified version _CLK2 of the clock signal CLK 2. In particular, the master clock signal CLK2 is passed through an inverter 9 prior to being input to the second receiver block 8. Thus the second receiver block 8 receives an inverted version of the clock signal CLK 2. The frequency of the clock signals used by the two receiver blocks 6 and 8 are the same but are phase shifted by 180° with respect to each other.

Each of the receiver blocks 6 and 8 comprises a shift register in which the data from the data bus 4 is stored. In the case of the first receiver block 6, the data from the data bus 4 is clocked into the shift register on the rising edge of the clock signal CLK 2. In the case of the second receiver block 8, the data from the data bus 4 is clocked into the shift register on the rising edge of the inverted version of the master clock signal CLK 2 which is input to the second receiver block 8. This can be regarded as being equivalent to clocking the data into the shift register of the second receiving block on the falling edge of the master clock signal CLK2.

Each of the receiver blocks 6 and 8 is arranged to store one frame of data at a time. The table below gives an example of one frame structure used with embodiments of the present invention.

TABLE 1

| 0 | 0 | 0 | 0 | 0 | 0 | 0 | 0 |
|---|---|---|---|---|---|---|---|
| 1 | data | data | data | data | data | data | data |
| 1 | data | data | data | data | data | data | data |
| 1 | data | data | data | data | data | data | data |
| 1 | data | data | data | data | data | data | data |

The frame structure shown in Table 1 commences with eight 0s which provides a synchronising flag. This enables the position of the beginning of the frame to be determined. Every eighth bit is arranged to be a 1. In other words, the 8th, 16th, 24th and 32nd bits are all 1. It should be appreciated that the first bit of the frame is the zero bit. Thus, the data which is sent from circuit 1 to circuit 2 contains a known pattern of 1,1,1,1 at known positions in the frame. This known pattern is prestored in memory capacity 10 of circuit 2. In embodiments of the invention, the combination of eight zeros followed by a 1 actually indicates the beginning of the frame. The 1 is in fact the first bit of the known pattern. In practice, a series of zeros are provided between adjacent frames. Accordingly, more than eight consecutive zeros may occur. The first 1 of the known pattern enables the beginning of the frame to be located. The data is stored in the shift, register which stores one frame,of data at a time. In alternative embodiments of the present invention, the shift register may store more than one frame of data at a time. Thus, when the shift register has eight 0s followed by a 1 in the zero to eighth bit positions, the beginning of a frame is identified.

Two comparison blocks 12 and 14 are provided. Each comparison block 12, 14 has two inputs 12a, 12b, 14a and 14b respectively. The comparison blocks 12 and 14 may comprise logic gates. For example, the comparison block 12 and 14 may include at least one AND gate and/or a NAND gate. The first inputs 12a and 14a respectively are arranged to receive the known pattern of 1, 1, 1, 1 from the memory capacity 10 whilst the second inputs 12b and 14b are connected to an output 6c and 8c respectively of the receiving blocks 6 and 8. In particular, the second input 12b and 14b of each comparison block 12 and 14 is arranged to receive the data from the shift register of the respective receiving block 6 and 8 corresponding to the 8th, 16th, 24th and 32nd bits. The comparison blocks 12 and 14 provide a first output if the known pattern matches the pattern received by the respective receiving blocks 6 and 8 and a second, different output if there is no match.

The memory capacity 10 is also arranged to store the synchronizing flag which consists of the eight consecutive zeros at the beginning of a frame. Each receiver block 12 and 14 is also arranged to receive from the respective receiver block 6 and 8, the first eight bits in the shift register or the eight bits corresponding to the beginning of a frame. Each comparison block 12 and 14 is thus arranged also to carry out a comparison between the synchronizing flag and the first eight bits in the shift register of the respective receiver block 6 and 8.

In one preferred embodiment of the present invention, each comparison block 12 and 14 consists of a first comparison circuit, circuit A, and a second comparison circuit, circuit B. Circuit A is arranged to receive the synchronizing flag from the memory capacity 10 and the first eight bits from the shift register of the respective receiver block. Circuit A will compare that data and provide an output to circuit B. Circuit B will only be enabled if circuit A detects a match between the synchronizing flag and the first eight bits of the respective shift register. In the absence of any match, circuit A will provide an output to circuit B which disables that circuit. Circuit B receives the known pattern from the memory storage capacity 10 and the received pattern from the respective receiver block. The output of circuit B provides the output of the respective comparison block 12 and 14. Circuit B provides the first output if there is a match between the known pattern and the received pattern. The first output effectively also confirms that the synchronizing flag indicating the beginning of a frame has also been received. The second output provided by circuit B indicates that there is no match between the known pattern and the received pattern and/or that the synchronizing flag has not been received.

In one embodiment of the invention, one of the receiver blocks is designated as the default block. In this embodiment, only the comparison block which is connected to the designated default receiver block is activated. The activated comparison block will then compare the known pattern with the received pattern. If the known pattern matches the received pattern, then the comparison block which is connected to the designated default receiver block provides the first output. However if there is no match, then the comparison block in question provides the second output. The comparison block which is not connected to the designated default block is not activated and therefore provides no output. Alternatively, the output of the comparison block which is not connected to the default receiver block can be controlled to provide the second output, without carrying out any comparison.

The output of each comparison block 12 and 14 is connected to a decision making circuit 16 which is arranged to see which of the two comparison blocks 12 and 14 is activated. In other words, the decision making circuit 16 ascertains which is the designated default receiver block by determining which comparison block provides an output. In the above described modification, the decision making circuit 16 ascertains the default receiver block by determining which of the two comparison blocks is activated. The comparison block connected to the default receiver block may alternatively be arranged to provide a signal to the decision making indicating that it is the comparison block connected to the default receiver block. The decision making circuit also ascertains what output is provided by the comparison block connected to the default receiver block.

The decision making circuit 16 is connected to each of the two receiver blocks 6 and 8 via lines 16a and 16b respectively. The output of the decision making circuit 16 provides an enabling signal to the default receiver block 6 or 8 if the respective comparison block connected to the default receiver block indicates that there is a match between the known pattern and the received pattern. However, if the comparison block connected to the default receiver block indicates that there is no match, then the decision making block will enable the other receiver block, ie the receiver other than the default receiver block.

The decision making block 16 will determine that there is no match if the comparison block connected to the default receiver block does not provide the first output within a predetermined period of time. That predetermined of time can be set as required and, may for example, be 100 clock cycles. Thus, if the comparison block connected to the default receiver block does not determine that there is a match between the known pattern and the stored pattern within the predetermined time period, then the receiver block other than the default receiver block will become the new default receiver block. In one modification, the new default receiver block is automatically enabled.

Each of the receiver blocks 6 and 8 has a further output line 18 and 20 respectively. When a receiver block 6 or 8 is enabled by the decision making circuit 16, the data received on data bus 4 is output by that given receiver block 6 or 8 on the respective output line 18 or 20. The decision making circuit 16 may also provide a disable signal which disables the receiver block 6 or 8 which has not been enabled. The disabled receiver block 6 or 8 will therefore be prevented from outputting the received data on the respective output line 18 or 20. Thus, one receiver block is enabled whilst the other is disabled.

In one modification to this embodiment, if the comparison block connected to the designated default receiver block provides the second output, indicating that there is no match between the known pattern and the received pattern, the other comparison block will then be activated. If the other comparison block which is not connected to the default receiver block provides the first signal indicating that the known pattern matches the received pattern, the receiver block to which the other comparison block is connected will be activated. However, if the other comparison block provides the second signal indicating that the known pattern does not match the received pattern, then neither of the receiving blocks will be enabled and the decision making circuit 16 will provide an error flag on output 21.

In a further modification to the above described embodiment, both of the comparison blocks are always activated at the same time. Thus each comparison block will compare the respective received pattern with the known pattern at the same time. If only one comparison block indicates a match, then the receiver block to which the comparison block providing the output indicative of a match is connected will be enabled by the decision making circuit 16. However, if both comparison blocks 12 and 14 provide an output indicative of a match, then the designated default receiver block will be enabled whilst the other receiver block is disabled. If neither of the comparison blocks 12 and 14 provides an output, indicating that there is a match between the known pattern and the received pattern then the decision making circuit will output an error flag on its output 21.

In some embodiments of the present invention, there may be a fault, for example, in the bus between the first and second circuit. In that situation, the input to the second circuit may be stuck at one logic level, either 1 or 0. In those circumstances, neither of the comparison blocks 12 and 14 will be able to provide an output indicating that there is a match between the known pattern and the received pattern. This is because either the synchronizing flag or the known pattern will not be detected. Unless both the synchronizing flag and the known pattern are detected, neither the comparison blocks 12 or 14 will provide the first output. Thus, the arrangement of the present invention can also be used to detect errors in the bus between the first and second circuits. Problems with the bus may occur, for example, if there is no circuit 1 and the second circuit is coupled to a pull up resistor so that it appears that a signal is in fact being received from the bus.

It should be appreciated that in the above described embodiments, each comparison block should only be able to provide the first signal once an entire frame has been received by the respective receiver blocks. This is because the first signal is only provided if the synchronizing flag and the known pattern are detached. Each comparison block may have a simple structure providing circuit B which allows a binary AND operation to be performed between the known pattern and the received pattern. Likewise, circuit A of each comparison block may have simple structure which allows a binary AND operation to be performed between the synchronizing flag and the relevant bits of the shift register.

The receiver block which is designated the default receiver block may be altered from time to time. For example, the receiver block which is enabled for the previous frame of data may be the default receiver block for the current frame of data. Alternatively one of the receiver blocks may always be designated as the default receiver block.

Reference will now be made to FIG. 2. FIG. 2a illustrates an example of the data which is sent from circuit 1 to circuit 2 via data bus 4. The data shown in FIG. 2a has the frame structure shown in Table 1. In particular, the first 8 bits are zero which indicates to the receiver blocks 6 and 8 that this is the beginning of the frame. The 8th, 16th, 24th and 32nd bits are all 1 thus defining the known pattern. The remaining bits define the data which is to be transmitted. The master clock signal CLK 1 used by circuit 1 is illustrated in FIG. 2b. As can be seen from FIGS. 2a and 2b, the data is clocked out of circuit 1 on the rising edge of the clock signal CLK 1. As can be seen from FIG. 2, one bit of data is received for every clock cycle.

Figure 2A:
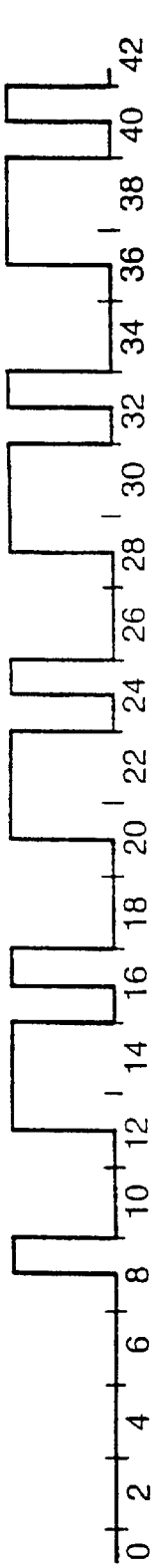
FIG. 2a shows an example of a data signal sent from a first circuit to a second circuit of the embodiment illustrated in FIG. 1.
Figure 2D:
FIG. 2d shows the data received from the first circuit when clocked into the second circuit by the rising edge of the clock signal shown in FIG. 2c.
Figure 2D:
Figure 2D:
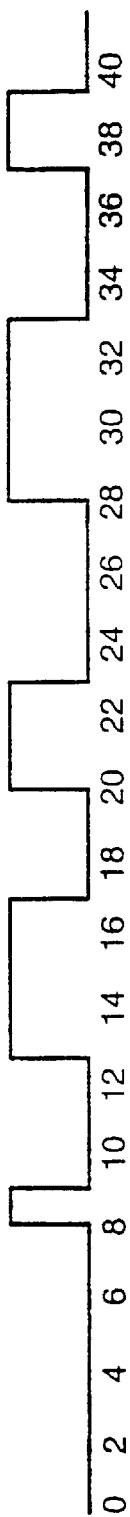
Figure 2E:
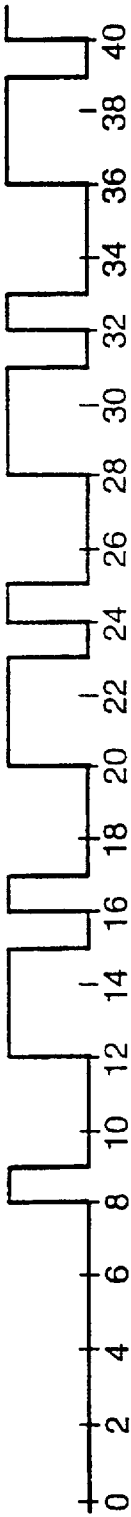
FIG. 2e shows the data received from the first circuit when clocked into the second circuit by the falling edge of the clock signal shown in FIG. 2c.

FIG. 2c shows the master clock signal CLK 2 of circuit 2. The clock signal CLK 2 of the second circuit, circuit 2, has the same frequency of the clock CLK 1 of the first circuit. As can be seen, the two clock signals CLK 1 and CLK 2 are substantially in phase. It should be appreciated that the embodiment shown in relation to FIG. 2 is a simplified embodiment which assumes that there are no delays resulting from the transmission of data from circuit 1 to circuit 2 along the bus. FIG. 2d shows the data received by the first receiver block 6 from circuit 1, which is clocked into the respective shift register on the rising edge of clock signal CLK 2. In contrast, FIG. 2e shows the data received by the second receiver block 8 from the first circuit which is clocked into the respective shift register on the rising edge of the inverse clock signal _CLK 2. This is equivalent to clocking the data into the shift register on the falling edge of the clock signal CLK 2.

As can be seen from FIG. 2d, the rising edge of the clock signal CLK 2 coincides with the points at which any changes in the value of the data from circuit 1 occur. For example, the rising edge of the clock signal CLK 2 coincides with the point where the transition between level 0 and level 1 occurs for the eighth bit of the data sent by the first circuit. As the receiver block 6 which uses the rising edge of the clock signal CLK2 is trying to determine the data at points at which transitions occur, the receiver block 6 will not reliably be able to read the data. As can be seen from FIG. 2d, for example, the twenty fourth bit is incorrectly read as a 0 instead of a 1. Thus, the pattern received by the first receiver block 6 is 1, 1, 0, 1 instead of the known 1, 1, 1, 1. This incorrect pattern is thus a result or receiver block trying to read the received data at points where transitions between the 0 and the 1 levels occur. At these transition points, the data from circuit 1 can not be reliably read. In some cases where the data signal and the clock signal 9 for example CLK 2, rise at the same time, the received data may be read as "1" whilst at other times it may be read as "0". The rising received data should of course be read as "1". Similar problems may occur if the data signal falls at the same time as the clock signal rises. The comparison block 12 connected to the first receiver block 6 would provide the second signal indicating that there is no match between the received data and the known pattern.

We refer now to FIG. 2e where the received signal is clocked into the shift register of the second receiver block 8 on the falling edge of the clock signal CLK 2. The falling edges of the clock signal CLK2 occurs after any transition between the 0 level and the 1 level has taken place. In other words, there is no ambiguity in the value of the data from circuit 1 at the point at which it is clocked into the second receiver block 8. Accordingly, the second receiver block 8 will receive a correct version of the data sent from circuit 1. The pattern received by the second receiver block is 1, 1, 1, 1 which matches the known pattern. Accordingly, the comparison block 14 coupled to the second receiver block 8 will provide the first output indicating that there is a match between the received pattern and the known pattern.

As discussed hereinbefore, problems in reading the incoming data occur when the data signal rises or falls at the same time that the clock signal rises. This can, for example, be caused by temperature changes which in turn cause different delays in the transmitting and/or receiving circuits. Alternatively, or additionally, electrical interference resulting from, for example cross talk between other wires could effect the rising and falling times of the data bus. It also should be appreciated that the changes in the relative phase between the clock signal of the first circuit and the clock signal of the second circuit can occur during use of the circuit, for example resulting from increasing temperature through use.

As described above, the two comparison blocks may not always be activated at the same time. In the case where the receiver block 6 is the default receiver block, the second receiver block 8 may be automatically enabled when the comparison block 12 connected to the first receiver block provides a second output indicating no match. As discussed above, the comparison block 14 coupled to the second receiver block 8 may also carry out the comparison before the second receiver block 8 is enabled. Alternatively, both of the comparison blocks 12 and 14 may compare the known pattern with the received pattern at the same time. This would again result in the second receiver block 8 being enabled.

The decision making circuit 16 will thus provide an enable signal to receiver block 8 and a disable signal to receiver block 6. Thus, the data received by the second receiver block 8 is considered to represent the data sent from circuit 1 and accordingly is processed further. In particular, the data received by the second receiver block 14 will be output via output line 20. The data received by the first receiver block is ignored and no output is provided on output line 18.

If the first receiver block 6 is the default receiver block, the second receiver block 8 may be the new default receiver block in respect of the next frame of data.

In one modification to the above described embodiment the decision making circuitry 16 also includes memory capacity which stores for each successive frame information as to which of the two receiver blocks 6 or 8 is enabled. This provides an indication as to the reliability of the serial bus. Thus, if one receiver block is continuously enabled or enabled for the majority of the time, then it can be determined that the serial bus is reliable. If, however, both of the receiver blocks 6 and 8 are regularly enabled, then it can be determined that the serial bus 4 is not particularly reliable.

Figure 3:
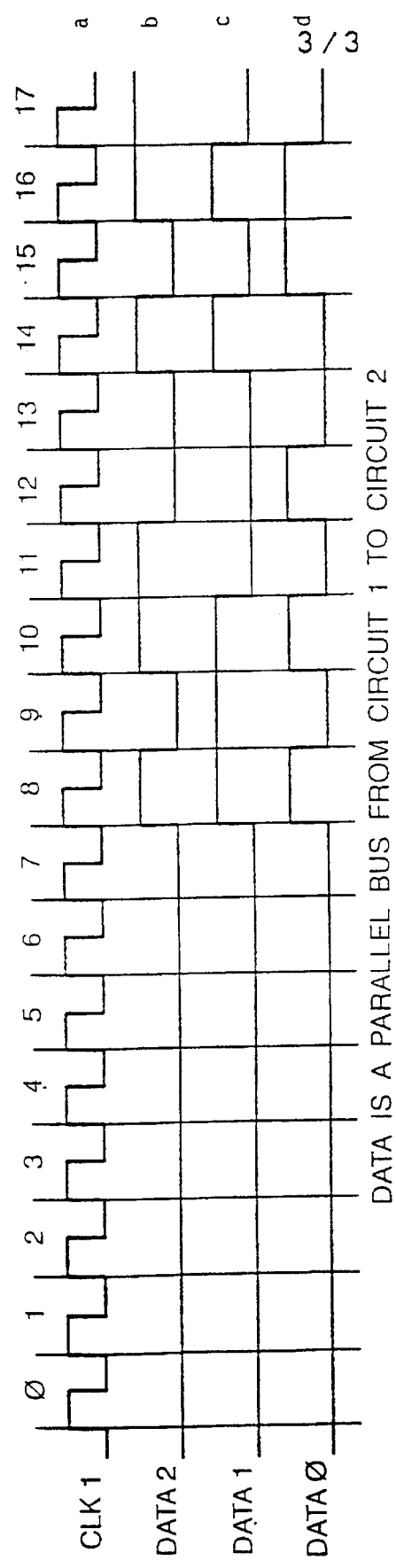
FIG. 3a shows a clock signal used by the first circuit in a further embodiment of the invention.
FIGS. 3b to d shows the signal sent on three wires of a three wire parallel data bus of the further embodiment of the invention.

In one modification to the present invention, a parallel bus can be used in place of the serial bus. That parallel bus would be provided between the first circuit, circuit 1 and the second circuit, circuit 2. Reference is made to FIG. 3 which illustrates the data sent between circuit 1 and circuit 2 using such a bus. The data bus illustrated in FIG. 3 is parallel and three bits wide. The first seventeen data words sent from the circuit 1 to circuit 2 are illustrated in FIG. 3 along with the clock signal CLK 1 for circuit 1. DATA 2 is the most significant bit (MSB) whilst DATA 0 is the least significant bit (LSB). DATA 1 provides the middle bit of each word. The frame structure used in the modification described in relation to FIG. 3 is as follows:

| Word Number | DATA 2 | DATA 1 | DATA 0 | Function |
|---|---|---|---|---|
| 0 | 0 | 0 | 0 | synchronising flag |
| 1 | 0 | 0 | 0 | synchronising flag |
| 2 | 0 | 0 | 0 | synchronising flag |
| 3 | 0 | 0 | 0 | synchronising flag |
| 4 | 0 | 0 | 0 | synchronising flag |
| 5 | 0 | 0 | 0 | synchronising flag |
| 6 | 0 | 0 | 0 | synchronising flag |
| 7 | 0 | 0 | 0 | synchronising flag |
| 8 | 1 | 1 | 1 | known pattern |
| 9 | 0 | 1 | 0 | data |
| 10 | 1 | 1 | 1 | data |
| 11 | 1 | 0 | 0 | " |
| 12 | 0 | 0 | 1 | " |
| 13 | 0 | 0 | 0 | " |
| 14 | 1 | 1 | 0 | " |
| 15 | 0 | 0 | 1 | " |
| 16 | 1 | 1 | 1 | known pattern |
| 17 | 1 | 0 | 0 | data |

This above described structure may be the complete frame structure or only part of the frame structure which can of course be selected as desired.

As can be seen from the above table, the first eight words (words 0 to 7) are all 0, 0, 0 and provide the synchronizing flag. This is analogous to the first eight bits which are zero in the frame structure used in relation to the first described embodiment. The eighth and sixteenth words are both 1, 1, 1 and correspond to the known pattern of the first embodiment. As each word consists of three bits, the eighth and sixteenth words only may constitute the known pattern. However, it will be appreciated that the known pattern could, for example, also include the twenty-fourth and thirty-second words if present.

Finally, the data to be sent from circuit 1 to circuit 2 is included in data word numbers 9 to 15. It should be appreciated that in a frame more than eight data words may of course provided.

In the described embodiments, one of the two clock signals used by the receiver circuit is the inverse of the other clock signals used by the receiver circuit 2. In other words the phase difference between the two clock signals used by is 180°. In alternative embodiments, the two clock signals used by the receiver circuit 2 may have any other suitable phase difference.

In another modification to the embodiments of the invention already described, the receiver circuit 2 may have more than two receiver blocks. In particular, any number of receiver blocks can be provided. A clock signal would be provided for each receiver block, the clock signals all being phase shifted with respect to one another. For example, three receiver blocks may be provided and the respective clock signals may be phase shifted by 120° with respect to one another. In another modification, a plurality of sets of receiver blocks are provided. For example each set may comprise two receiver blocks as described hereinbefore. If several sets of receiver blocks are provided, the data could include an address field inside the associated data field. If an address is provided then the respective data field would be received by the respective addressed set of receiver blocks. In other words different data fields are received by different sets of receiver blocks. If there is an address field, each set of receiver blocks may receive the whole frame and carry out the comparison between the known bits and the received bits. If there is a match, the address is checked and if correct, the data associated with that address will be stored and the other data will be destroyed. Where no address is provided, then the sets of receiver blocks may pick out their own data fields. For example the first set of receiver blocks may pick out the first 16 bits and a second set of receiver blocks may pick out the remaining bits.

Embodiments of the present invention have application in telecommunication networks and in particular mobile telecommunication networks. In a mobile telecommunication network, embodiments of the invention are advantageously provided in a base station of the mobile communication network. The mobile communication network may be analogue or digital and for example may be a GSM network. Embodiments of the present invention can be used in a number of different locations in the base station. For example, the first circuit can form part of the receiving circuit which receives data from a mobile phone. That data may be manipulated by the first circuit modify the received data. The second circuit may be arranged to further modify the received data and to pass the signals to a main part of the base station. The first and second circuits may be provided on digital boards arranged in the receiver part of the base transceiver station. Conversely, embodiments of the present invention may be arranged in the transmitting part of the base transceiver station. Thus, the first circuit may be arranged to receive data from the main part of the base transceiver station whilst the second circuit may be provided in the transmitting part of the base transceiver station.

Figure 4:
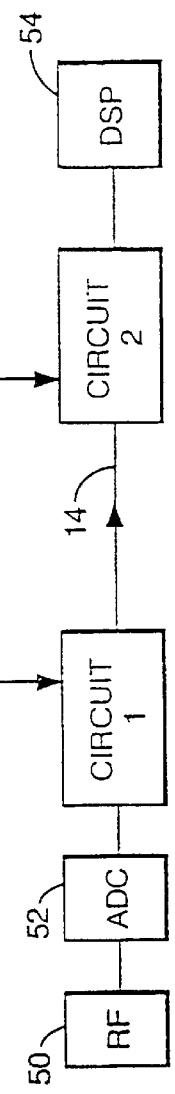
FIG. 4 shows schematically the data path in a base transceiver station incorporating circuits embodying the present invention.

FIG. 4 shows schematically the data path for a base transceiver station of a cellular telecommunications network incorporating an embodiment of the present invention. The data transmitted by a mobile station is carried on a carrier frequency which is received by an antenna arrangement 50 of the base transceiver station. The radio frequency signal which is received is manipulated to remove the carrier frequency component to bring the received signal down to the base band frequency. The received signal is passed to an analogue to digital converter 52 which converts the analogue signal to a digital signal. The output of the analogue to digital converter 52 is connected to circuit 1 as described hereinbefore.

The output of circuit 1 is connected to the input of circuit 2 which again is as hereinbefore described. The bus between the first circuit, circuit 1 and the second circuit, circuit 2 introduces an unknown delay in the signals between the circuits. The output of circuit 2 is connected to a digital signal processor 54 which typically will process the signal to recover speech.

The data transmitted from circuit 1 to circuit 2 is in "real time". However, it is envisaged in certain embodiments of the present invention that the rate of receipt of data by the first circuit may be greater than the rate of transmission to the second circuit. In those circumstances, a data buffer might be required.

The clock rate of the first clock CLK 1 and the second clock CLK 2 is selected so that real time transmission will be achieved. In the particular example shown in FIG. 4, the selected clock rate will be 26 MHz. This provides circuit 1 with enough time to send a data sample to the second circuit, circuit 2 before the next sample has to be sent. The clock rate will of course depend on the length of the data samples to be sent and the standard of the telecommunications system.

Circuit 1 is also arranged to send control data to circuit 2. For control data, HDLC (higher level data link control) frames can be used. For normal data, HDLC frames may be too slow to transmit the data samples. However, with control signals, these are not so time critical.

The bus between the circuit 1 and circuit 2 is preferably a serial bus as this can give more reliable results as compared to the situation where a parallel bus is used.

Whilst the embodiment described in FIG. 4 has been described in relation to a base transceiver station, it should be appreciated that embodiments of the present invention can be incorporated in a mobile station.

Embodiments of the present invention, when used in mobile telecommunication networks, allow the number of buses between the circuits to be reduced as compared to the prior art. Typically the transmitting and receiving circuits will each be application specific integrated circuits (ASICs). For example the transmitting circuit could be an ASIC which is arranged in the receiver part of the base transceiver station whilst the receiver circuit could be arranged in a processing part of the base transceiver which is used to manipulate the received data. The data which is passed between the first and second circuits may be control data and GSM data samples.

The serial or parallel bus described hereinbefore may be provided between two digital boards. The transmitter circuit may be on one board with the receiving circuit on the other board. The transmitting and receiving circuits may be ASICs arranged on the respective boards.

In those embodiments of the present invention where the decision making circuitry monitors the reliability of the data bus, the reliability may be monitored typically over the period corresponding to one GSM time slot or one GSM frame. Typically, one time slot will be used. Several frames of data can be sent between the first and second circuits in one GSM time slot.

The data field used in embodiments of the present invention could contain some known frame structure. For example, the data field could be a HDLC-frame (High Level Data Link Control) or a part of an HDLC-frame so the whole HDLC-frame will be sent inside several frames. Where a frame structure is used, it will be appreciated that the length of the frame will be known. Spacing bits may be provided between consecutive frames. Those spacing bits may be, for example, five O's. The synchronizing flag allows the beginning of the frame to be located and hence the values of the 8th, 16th, 24th and 32nd bits at the frame can then be considered. If a frame structure is used, the data field may include some spare bits. There is no requirement to use all the data bits but all the known bits, i.e. the known pattern must be sent at the right positions within the frame. The data field of the frame could also contain some known check sum parity check field for example a CRC sum (cyclical redundancy check sum). This increases the reliability of the second circuit and the CRC information could also be used to correct the receiver circuit output.

The second circuit, circuit 2 may comprise a processor which processes the received data to carry out the, for example, cycle redundancy check sum. The processor may be arranged either to inhibit the output of the respective receiver if an error is detected or to modify the received data in order to correct any errors. This check can be carried out at the same time or after the various comparisons are made by the respective comparison blocks.

It should be appreciated that in preferred embodiments of the present invention, the two receiver blocks have the identical construction. Embodiments of the present invention are preferably used with digital serial buses or digital parallel buses, as illustrated hereinbefore. However, the bus between the two circuits can be replaced by a wire-less link such as a radio link.

What is claimed is:

1. A circuit for receiving data comprising:
    a first receiver having an input for receiving said data and an input for receiving a first clock signal, whereby said data is clocked into said first receiver by said first clock signal;
    a second receiver having an input for receiving said data and an input for receiving a second clock signal, said first and second clock signals having an identical clock frequency and being phase shifted with respect to one another, whereby said data is clocked into said second receiver by said second clock signal;
    determining circuitry for determining if at least one of said receivers has correctly received said data; and
    enabling circuitry for selectively enabling a first output of one of the receivers in accordance with the determination made by said determining circuitry, wherein said determining circuitry is arranged to detect an indication of the beginning of the data and to determine if the data received by at least one of said receivers includes a known pattern, and wherein said determining circuitry is arranged to determine if the data received by at least one receiver includes the known pattern only if the indication of the beginning of data has been detected.

2. A circuit as claimed in claim 1, wherein said determining circuitry is arranged to determine if the data received by at least one of said receivers includes data indicating the beginning of the data.

3. A circuit as claimed in claim 1, wherein one bit of said received data is received in a clock cycle of said first and second clock signals.

4. A circuit as claimed in claim 1, wherein one of said first and second clock signals is the inverse of the other of said first and second clock signals.

5. A circuit as claimed in claim 1, wherein said determining circuitry comprises first comparison circuitry connected to a second output of said first receiver and second comparison circuitry connected to a second output of the second receiver.

6. A circuit as claimed in claim 1, wherein said determining circuitry is arranged to determine if one of said first and second receivers has correctly received data and said enabling circuitry is arranged to enable the first output of said one of said first and second receivers if the determining circuitry determines that said data has been correctly received and to enable the first output of the other of said first and second receivers if the determining circuitry determines that the data has not been correctly received by said one of said first and second receivers.

7. A circuit as claimed in claim 6, wherein said determining circuitry is arranged to determine if the other of said first and second receivers has correctly received data only if it is determined by said determining circuitry that said one of said first and second receivers has not correctly received said data.

8. A circuit as claimed in claim 1, wherein said determining circuitry is arranged to determine if the first receiver and the second receiver have correctly received said data and said enabling circuitry is arranged to enable the first output of one of said receivers which has correctly received said data.

9. A circuit as claimed in claim 1 operable such that if data is not correctly received by said first receiver or said second receiver, said enabling circuitry provides an error output.

10. A circuit as claimed in claim 1, wherein one of said first and second receivers is designated as a default receiver, said enabling circuitry being arranged to enable said default receiver if both of said first and second receivers have correctly received said data.

11. A circuit as claimed in claim 1, wherein one of said receivers is a default receiver, said circuit being operable such that if said default receiver does not correctly receive said data, the other receiver will be the default receiver.

12. A circuit as claimed in claim 10 operable to designate the default receiver based on which receiver was enabled by said enabling circuitry for a previous portion of data.

13. A circuit as claimed in claim 1, comprising circuitry for monitoring the number of times at least one of said receivers in enabled in a predetermined time period.

14. A circuit as claimed in claim 13, wherein the predetermined time period is a GSM time slot.

15. A circuit as claimed in claim 1, wherein said circuit further comprises circuitry for checking the received data for errors.

16. A circuit as claimed in claim 1, wherein said identical clock frequency is between 20 and 30 MHz.

17. A circuit for receiving data as claimed in claim 1 coupled to a transmitting circuit by a data bus between said receiving circuit and said transmitting circuit, said receiving circuit being arranged to receive said data from said transmitting circuit via said data bus.

18. Circuitry as claimed in claim 17 wherein said transmitting and receiving circuits are arranged on respective digital boards.

19. Circuitry as claimed in claim 17, wherein said transmitting circuit is provided with a clock signal which is used to clock said data onto said bus, said clock signal of the transmitting circuit having the identical clock frequency as the first and second clock signals of the receiving circuit.

20. Circuitry as claimed in claim 17, wherein said bus is a serial bus.

21. Circuitry as claimed in claim 17, wherein said bus is a parallel bus.

22. Circuitry as claimed in claim 17, wherein said data is transmitted between said transmitting and receiving circuits in real time.

23. A telecommunication network including circuitry as claimed in claim 17.

24. A base transceiver station of a mobile telecommunication network including circuitry as claimed in claim 17.

25. A base transceiver station as claimed in claim 24, wherein a portion of said transmitting circuit is arranged to receive data from a mobile station in said mobile telecommunications network and a portion of said receiving circuit is connected to a digital signal processor of said base transceiver station.

26. A mobile station of a mobile telecommunications network comprising circuitry as claimed in claim 17.

27. A method for receiving data comprising the steps of clocking said data into a first receiver using a first clock signal;

clocking said data into a second receiver using a second clock signal, the first and second clock signals having an identical clock frequency and being phase shifted with respect to one another;

detecting an indication of the beginning of the data;

determining a known pattern if the indication of the beginning of the data has been detected;

determining if at least one of said receivers has correctly received said data; and enabling the output of one of said receivers in accordance with the determination made in the step of determining if the at least one of said receivers has correctly received said data, wherein the determination of whether at least one of said receivers has correctly received said data only occurs if said indication of the beginning of the data has been detected and the data received by at least one of said receivers includes the known pattern.

28. A circuit for receiving data comprising:

a first receiver having input for receiving said data and an input for receiving a first clock signal, whereby said data is clocked into said first receiver by said first clock signal;

a second receiver having input for receiving said data and an input for receiving a second clock signal, said first and second clock signals having an identical clock frequency and being phase shifted with respect to one another, whereby said data is clocked into said second receiver by said second clock signal;

determining circuitry for determining if at least one of said receivers has correctly received said data;

enabling circuitry for selectively enabling a first output of one of the receivers in accordance with the determination made by said determining circuitry, wherein said circuit is operable to designate a default receiver based on which receiver was enabled by said enabling circuitry for a previous portion of data and wherein said determining circuitry is arranged to detect an indication of the beginning of the data and to determine if the data received by the at least one of said receivers includes a known pattern, and wherein said determining circuitry is arranged to determine if the data received by at least one receiver includes the known pattern only if the indication of the beginning of data has been detected.

* * * * *